(12) United States Patent
Cai et al.

(10) Patent No.: US 9,779,128 B2
(45) Date of Patent: Oct. 3, 2017

(54) SYSTEM AND METHOD FOR MASSIVELY PARALLEL PROCESSING DATABASE

(71) Applicant: Futurewei Technologies, Inc., Plano, TX (US)

(72) Inventors: Le Cai, Cupertino, CA (US); Guogen Zhang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 772 days.

(21) Appl. No.: 14/249,558

(22) Filed: Apr. 10, 2014

(65) Prior Publication Data

US 2015/0293966 A1 Oct. 15, 2015

(51) Int. Cl.
*G06F 7/00* (2006.01)
*G06F 17/30* (2006.01)
*G06F 11/14* (2006.01)

(52) U.S. Cl.
CPC .... *G06F 17/30377* (2013.01); *G06F 11/1446* (2013.01); *G06F 11/1451* (2013.01); *G06F 17/30088* (2013.01); *G06F 17/30445* (2013.01); *G06F 2201/80* (2013.01); *G06F 2201/835* (2013.01)

(58) Field of Classification Search
CPC ........................ G06F 11/1446; G06F 17/30088
See application file for complete search history.

(56) References Cited

U.S. PATENT DOCUMENTS

| 5,278,982 | A  | * | 1/1994  | Daniels ............... G06F 11/1471 |
| 5,414,840 | A  |   | 5/1995  | Rengarajan et al.                   |
| 8,346,714 | B1 |   | 1/2013  | Ramesh et al.                       |
| 8,356,007 | B2 |   | 1/2013  | Larson et al.                       |
| 8,364,648 | B1 | * | 1/2013  | Sim-Tang ......... G06F 17/30368 707/674 |
| 8,671,074 | B2 |   | 3/2014  | Wang et al.                         |
| 8,909,604 | B1 | * | 12/2014 | Holenstein ......... G06F 11/1469 707/678 |
| 8,990,536 | B2 |   | 3/2015  | White                               |
| 2004/0236746 | A1 |   | 11/2004 | Lomet                             |
| 2006/0167960 | A1 | * | 7/2006  | Lomet ............... G06F 17/30353 |
| 2007/0244918 | A1 | * | 10/2007 | Lee ..................... G06F 11/1471 |
| 2009/0300074 | A1 | * | 12/2009 | Little ................ G06F 17/30377 |
| 2012/0102006 | A1 |   | 4/2012  | Larson et al.                     |

(Continued)

FOREIGN PATENT DOCUMENTS

| CN | 102214205 A | 10/2011 |
| CN | 102419764 A | 4/2012  |

(Continued)

OTHER PUBLICATIONS

International Search Report of Patent Cooperation Treaty (PCT), International Application No. PCT/CN2015/076173, Applicant Huawei Technologies Co., Ltd., dated Jul. 17, 2015, 11 pages.

*Primary Examiner* — Charles Lu
(74) *Attorney, Agent, or Firm* — Slater Matsil, LLP (57) ABSTRACT

In one embodiment, a method of performing point-in-time recovery (PITR) in a massively parallel processing (MPP) database includes receiving, by a data node from a coordinator, a PITR recovery request and reading a log record of the MPP database. The method also includes determining a type of the log record and updating a transaction table when the type of the log record is an abort transaction or a commit transaction.

21 Claims, 7 Drawing Sheets

(56) References Cited

U.S. PATENT DOCUMENTS

2012/0166407 A1    6/2012  Lee et al.
2014/0095452 A1*   4/2014  Lee .................... G06F 11/1471
                                                      707/683
2015/0254298 A1*   9/2015  Bourbonnais ....... G06F 11/1474
                                                      707/610

FOREIGN PATENT DOCUMENTS

CN         102831156 A    12/2012
CN         103718154 A     4/2014

* cited by examiner

SYSTEM AND METHOD FOR MASSIVELY PARALLEL PROCESSING DATABASE

TECHNICAL FIELD

The present invention relates to a system and method for databases, and, in particular, to a system and method for massively parallel processing databases.

BACKGROUND

Massively parallel processing (MPP) database management systems scale by distributing data partitions to servers and running transactions in parallel. A single transaction can be processed in parallel on multiple servers. Such parallel processing presents challenges to transaction management, multi-version concurrency control (MVCC), and recovery.

A global transaction manager (GTM) supports atomicity consistency isolation duration (ACID) compliant transactions in an MPP database. The GTM provides a global transaction identification number (ID) to uniquely identify a transaction in the system. When a transaction involving multiple servers commits, a two-phase commit is conducted to ensure that the processing of the transaction in all the servers has been completed. The GTM also offers a global snapshot of active transactions to support MVCC, a fundamental mechanism to achieve high concurrency, enabling readers to avoid blocking writers, and writers to avoid blocking readers. In MVCC, when a database record is updated, it is not replaced by the updated record. Instead, a new version of the record is created. Both the old and new versions exist in the system, so readers and writers of the same record avoid blocking each other. They can access the right version based on the snapshot taken when a transaction or statement starts, and the transaction IDs stored in the header of the record, representing transactions performing an update. When those updating transactions, such as insert, update, and delete, commit before the snapshot is taken, their versions are visible.

Taking a snapshot and transferring it to servers for each transaction or statement causes the GTM to become a potential performance bottleneck. The visibility check using transaction IDs and transaction status log, such as Clog in PostgreSQL, is often complicated, because time information is not used to determine the occurrence of events.

SUMMARY

An embodiment method of performing point-in-time recovery (PITR) in a massively parallel processing (MPP) database includes receiving, by a data node from a coordinator, a PITR recovery request and reading a log record of the MPP database. The method also includes determining a type of the log record and updating a transaction table when the type of the log record is an abort transaction or a commit transaction.

An embodiment method of performing a transaction in a massively parallel processing (MPP) database includes transmitting, by a coordinator to a global transaction manager (GTM), a reader timestamp request and receiving, by the coordinator from the GTM, a reader timestamp. The method also includes transmitting, by the coordinator to a plurality of data nodes, a plurality of transaction requests, where a first transaction request of the plurality of transaction requests includes the reader timestamp and receiving, by the coordinator from the plurality of data nodes, a plurality of transaction results.

An embodiment method of operating on a massively parallel processing (MPP) database includes receiving, by a data node from a coordinator, a begin transaction message including a global transaction identification number (GXID) and a reader timestamp and entering the GXID and the reader timestamp in a transaction table to produce a transaction entry. The method also includes performing a transaction in accordance with the begin transaction message producing transaction results and transmitting, by the data node to the coordinator, the results.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Global point-in-time recovery (PITR) is problematic in massively parallel processing (MPP) databases, because the data nodes run with their own timers, and a commit request of the same transactions may arrive at data nodes at different times. Using either time or transaction identification number (ID) as a recovery target in PITR does not achieve a consistent recovery point.

Figure 1:
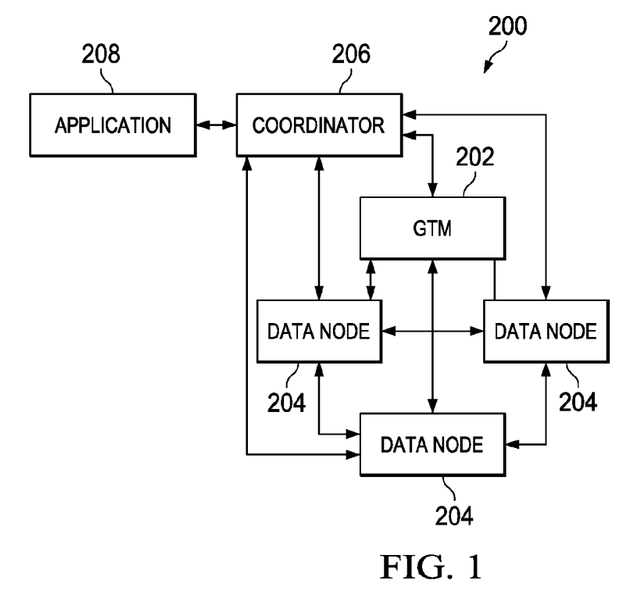
FIG. 1 illustrates an embodiment massively parallel processing (MPP) database.

An embodiment method uses global transaction manager (GTM) generated global timestamps to achieve read consistency and PITR for MPP databases. FIG. 1 illustrates MPP database 200. GTM 202, a centralized component, runs on a server. GTM is coupled to data nodes 204 to coordinate transactions. Three data nodes are pictured, but many more data nodes may be present. Coordinator 206 communicates with GTM 202 and data nodes 204. One coordinator is pictured, but more coordinators may be used. Coordinator 206 receives a transaction from application 208. Some example applications are a bank and an automated teller machine (ATM), system logging, phone call billing systems, experimental data, and other applications involving large amounts of data. Transactions and their statements register with GTM 202. Operations include start, end, commit, rollback, and abort. The time information from GTM 202, such as the return from gettimeofday( ), may become a globally unique tag for transaction operations. For example, if a transaction sends a commit request, GTM 202 returns a commit timestamp. When a reader starts its transaction, GTM 202 returns begin timestamp or reader timestamp. Those timestamps are stored in a transaction table. In a visibility check, if the reader timestamp is larger than the commit time of update transactions, the record is valid to access.

In addition to the transaction table, the timestamps are stored in log records for PITR. Using the timestamps in the log records, PITR can recover to any history point without setting barriers in logs and blocking transaction commit processes. If the recovery target is a specific time, the recovery aborts all transactions committed after the target time after replaying the log. If the recovery target is a transaction ID, it is translated into a recovery time using the transaction commit time from the transaction table or the commit log.

Figure 2:
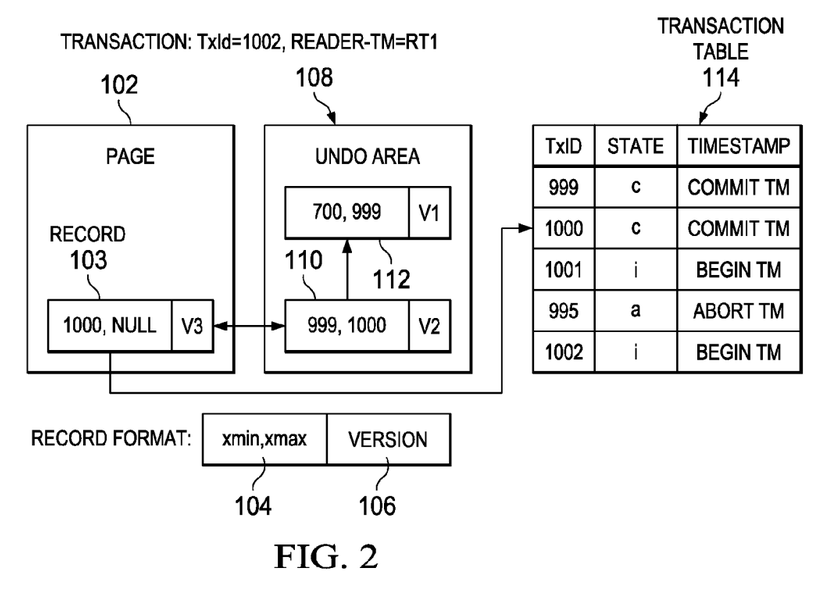
FIG. 2 illustrates embodiment record storage in an MPP database and an embodiment transaction table.

FIG. 2 illustrates an example record configuration in an MPP data node. The transaction identification number (TxId) is 1002, and the reader timestamp (TM) is RT1. Multiple versions of a record are maintained in the data node. Page 102 contains the current version, record 103. A record contains information 104, which contains xmin, xmax, and version 106. The version is the version number of the record, xmin is the transaction number that created the record, and xmax is the transaction number for the transaction which deleted the record and/or created the next version of the record. The old version of the record is moved to undo area 108. Record 103, version three, was created in transaction 1000. Because record 103 is the current version, xmax is null. The previous version of record 103 is record 110. Record 110, version 2 was created in transaction 999, with the next version created in transaction 1000 (record 103). The first version of the record is record 112, version 1, created in transaction 700, with the next version created in transaction 999.

Transaction table 114 contains the transactions with their current state, running (i), abort (a), or commit (c), and the corresponding timestamp. Only one timestamp for a transaction is recorded in all the data nodes. When a transaction is running, the timestamp represents its beginning time, the reader timestamp. When a transaction is committed or aborted, the timestamp is the time when the commit or abort process completes, the commit or abort timestamp. When a transaction begins, it acquires a timestamp from the GTM, called the reader timestamp, which is also referred to as the beginning timestamp. This transaction should not access the result of any transaction committed after the corresponding timestamp.

As shown in FIG. 2, a transaction with transaction ID (TxId) of 1002 starts and acquires a reader timestamp (RT1). When the transaction accesses a record, its last update is the transaction with TxId of 1000. In one example, the records indicate a bank account, and the transaction represents an operation on the account, such as a deposit or withdrawal. Transaction table 114 shows that the transaction with TxId 1000 has committed. If the commit timestamp is less than RT1, the latest version is visible to the transaction with TxId=1002. If RT1 is less than the commit timestamp, an older version of the record is checked. The earlier version of the record is transaction TxId=999. This continues until a visible version is found or the record cannot be accessed.

The transaction table can be built locally on the data nodes of an MPP database. When a transaction is changing a record, such as an insert, update, and delete, the transaction registers itself with local transaction managers on the individual data nodes storing the record. Transactions not changing local records do not affect the visibility check.

Figure 3:
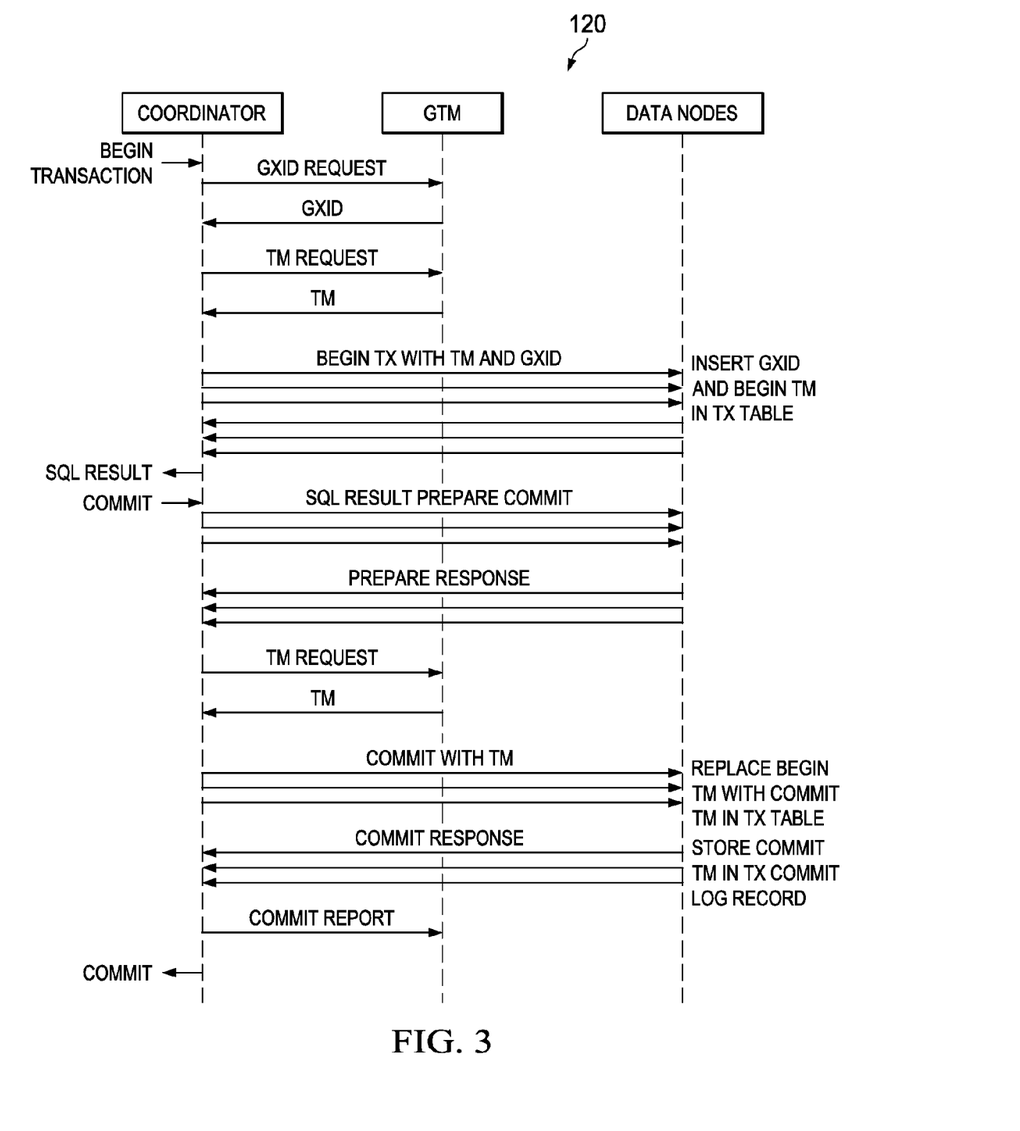
FIG. 3 illustrates an embodiment message diagram for performing a transaction in an MPP database.

FIG. 3 illustrates message diagram 120 for performing a transaction on an MPP database. There are three types of servers in an embodiment MPP database: one or more coordinator(s), a GTM, and multiple data nodes. The coordinator receives requests from applications. Based on the accessed data, the coordinator sends messages, such as modified structured query language (SQL) statements, to the data nodes, where the data is stored. Data nodes maintain their own transaction tables for visibility checks. When a transaction begins, the coordinator requests a global transaction ID (GXID) and a reader (or beginning) timestamp from the GTM. The GTM creates a GXID and a timestamp and transmits them to the coordinator. A GXID is not used in read-only transactions. However, read-only transactions do use reader timestamps. The coordinator transmits the GXID and the reader timestamp to the data nodes. Only the reader timestamp is transmitted in a read-only transaction. The data nodes update their local transaction tables with the new GXID and the reader timestamp.

The data nodes perform the transaction and send the results, for example SQL results, to the coordinator. The coordinator forwards the results to the application. The application issues a commit request to the coordinator. The coordinator initiates a 2-phase commit procedure by sending PREPARE COMMIT messages to the data nodes. After collecting the responses, the coordinator requests a commit timestamp from the GTM. The coordinator transmits the commit timestamp, along with a commit request, to the data nodes, which update their local transaction tables with the commit timestamp. The reader timestamp is replaced with the commit timestamp. The commit timestamp is also recorded in the commit log record for use in recovery. The data nodes transmit commit responses to the coordinator. The coordinator sends a commit report to the GTM, and also notifies the application that the commit has been successful. A similar process is conducted for abort transactions. When the coordinator collects responses from the data nodes for PREPARE COMMIT messages, some of the data nodes report commit failed. Instead of sending COMMIT messages, the coordinator sends an ABORT message, and an abort timestamp to the data nodes to abort the transaction. The data nodes receive the abort request and mark the transaction as aborted in their transaction tables with the abort timestamp. In an example, the two phase process is not performed for an abort.

In an example, for read-only transactions, only one message between the GTM and a coordinator is used to acquire a reader timestamp. For read-write transactions, an additional message is used to obtain the timestamp for commit or abort timestamp to update the transaction table. The messages containing one timestamp, which may be 8 bytes, are much smaller than the snapshot of a list of active transactions.

The GTM may generate the time using the gettimeofday call in Linux. The time is translated into a 64 bit value, representing the number of the total microseconds elapsed since the epoch. The timestamp may be replaced by an ascending sequence number. If the transaction isolation is read committed, the reader timestamp is acquired when the statement starts.

Figure 4:
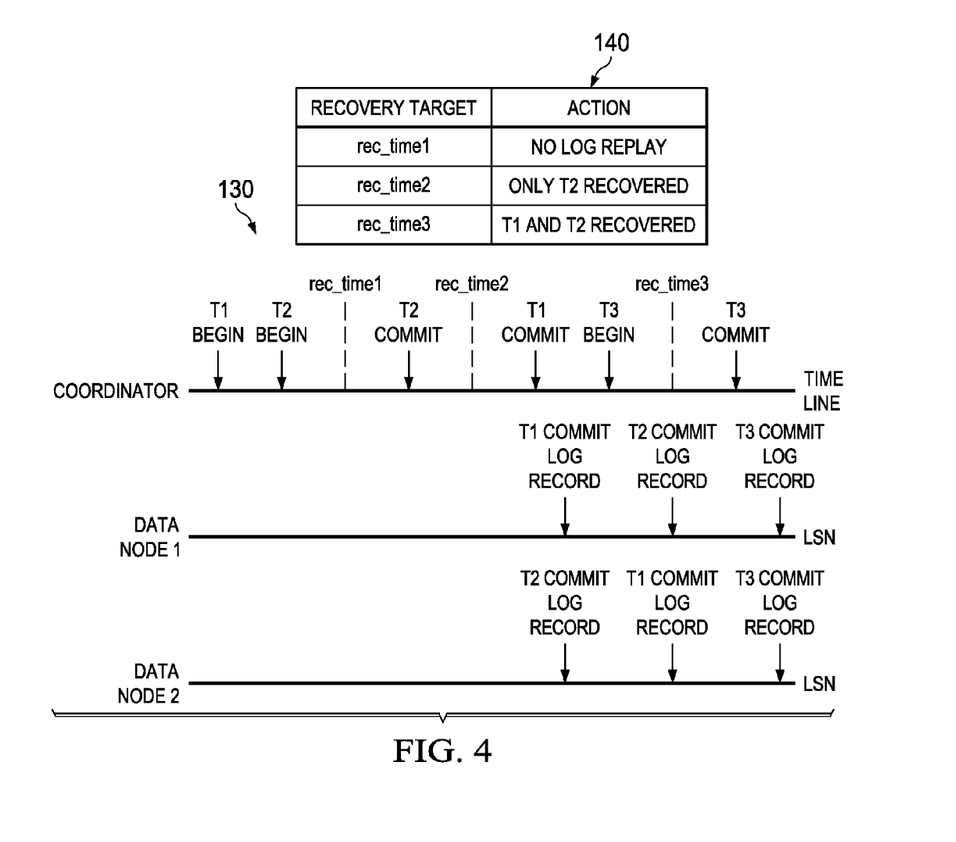
FIG. 4 illustrates an embodiment time sequence in an MPP database.

FIG. 4 illustrates timeline 130 for several transactions in an MPP database and their commit orders in coordinator and data nodes. For one transaction, the coordinator and the data nodes may see different commit orders, because they run on different servers. For example, from the coordinator's point of view, transaction T1 committed after transaction T2. Data node 2 also saw transaction T1 committed after transaction T2. However, in data node 1, T1 committed before transaction T2. This is because the commit requests sent from the coordinator may arrive at data node 1 in a different order than the order they were generated.

A file system backup may be taken before transactions T1, T2, and T3 start. MPP database PITR may restore the system to targets by replaying write-ahead logging (WAL) based on the file system backup. Table 140 shows log records to be replayed for recovery targets rec_time1, rec_time2, and rec_time3. Because there are no transactions committed before rec_time1, to recover to rec_time1, there is no log to replay. Transaction T2 was committed before rec_time2, and to recover to rec_time2, only transaction T2 is recovered. To recover to rec_time3, transaction T1 and transaction T2 are both recovered, because transactions T1 and T2 were both committed before rec_time3. Using the target of rec_time3 as an example, PITR will replay log records until transaction T1 is committed and both data node 1 and data node 2 should perform the recovery. However, even though T2 was committed before T1, they were committed in different orders on the data nodes. On data node 1, T1 was committed before T2. PITR replays log records on data node 1 until transaction T1 is committed and the transaction T2's commit log record is not processed. Transaction T2's change is not committed. Data node 1 generates inconsistent results with data node 2: data node 2 restores both transaction T1 and transaction T2, while data node 1 only restores transaction T1.

Global commit timestamps may be recorded in commit log records. These globally unique timestamps are used in PITR to restore the system to a historic point without inconsistency in the data nodes. FIG. 4 illustrates three recover targets: rec_time1, rec_time2, and rec_time3. Rec_time1 is after T1 and T2 began, and before they are committed. Both data node 1 and data node 2 compare the commit timestamps of T1 and T2 in commit records with rec_time1 and make the same conclusion, that there is no need for log replay. The target time rec_time2 is between the times when T2 and T1 committed. PITR should recover only T2. With commit timestamps, data node 1 can see that T1 has been committed after T2, even though T1's commit log record is generated before T2's commit log recording. After replaying WAL, data node 1 and data node 2 marks T1 as aborted and T2 as committed. For the target of rec_time3, both T1 and T2 were committed, and their updates should be recovered as committed. T3 began but has not yet committed, so T3 is set as aborted. For recovery targets using a transaction ID, the recovery target can be translated to the transaction's commit timestamp. The recovery follows the same logic using time as the recovery target.

Figure 5:
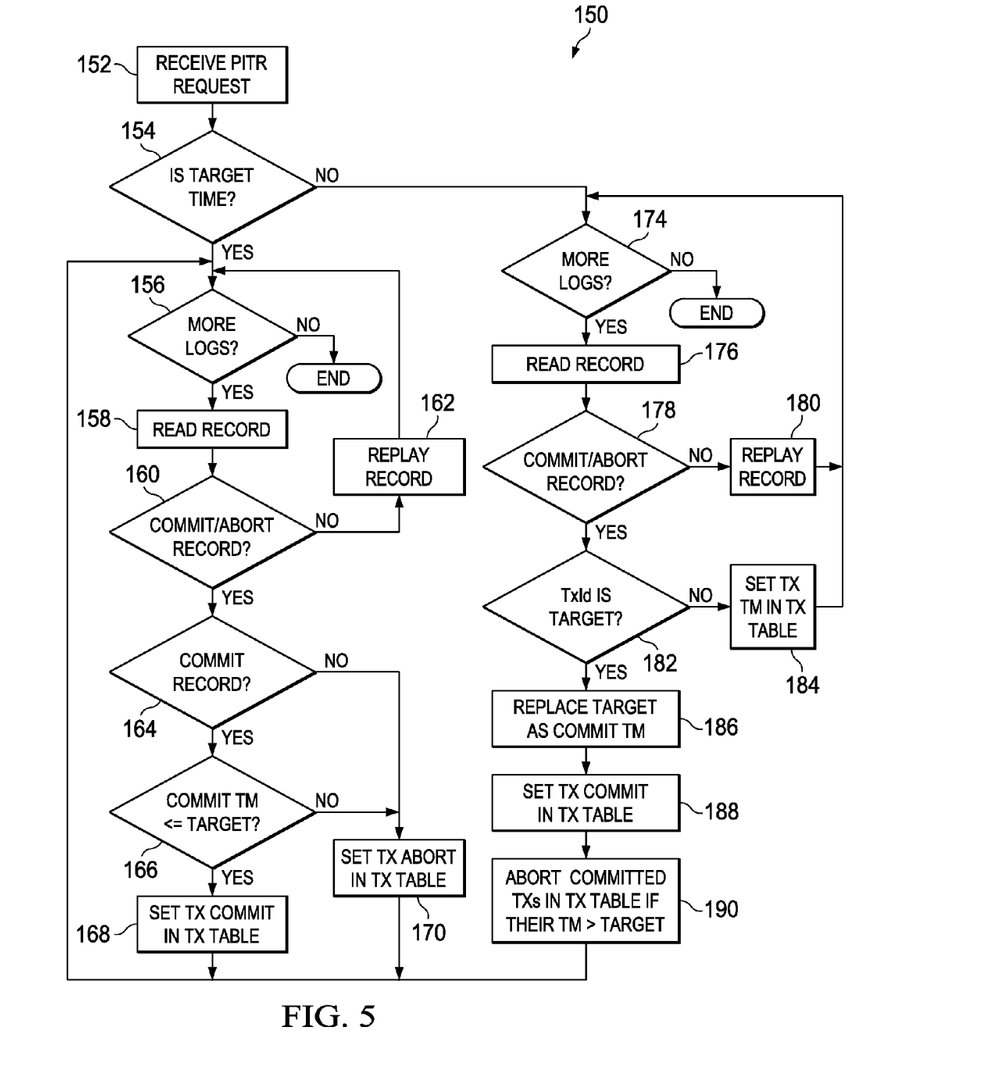
FIG. 5 illustrates a flowchart for an embodiment method of point-in-time recovery.

FIG. 5 illustrates flowchart 150 for a method of PITR. Initially, in step 152, a data node receives a PITR recover request, for example from a coordinator. The PITR recovery request includes the target. The target may be a time or a transaction ID.

In step 154, the data node determines whether the target is a time or a transaction ID. When the target is a time, the data node proceeds to step 156, and when the target is a transaction ID, the data node proceeds to step 174.

In step 156, the data node determines whether there are additional logs to be considered for recovery in the data node. When there are no additional logs, the method ends. When there are additional logs, the data node proceeds to step 158, and reads the next record.

Step 160 determines whether the record is a commit or abort record. When the record is not a commit or abort record, the record is replayed in step 162, and the flow returns to step 156 to consider additional targets. When the record is a commit or abort, the data node proceeds to step 164.

In step 164, the data node determines whether the record is a commit record or an abort record. When the record is an abort record, the data node sets the transaction in the transaction table to abort in step 170, and returns to step 156. When the record is a commit record, the data node proceeds to step 166.

In step 166, the data node determines whether the commit TM is before the target timestamp. When the commit timestamp is after the target timestamp, the data node proceeds to step 170 to set the transaction entry in the transaction table to abort. When the commit timestamp is before the target timestamp, the data node sets the transaction entry in the transaction table to commit in step 168, and returns to step 156 to consider additional records.

In step 174, the data node determines whether there are additional logs to examine for recovery. When there are no more logs, the method ends. When there are more logs, the data node proceeds to step 176 and reads the next record.

Then, in step 178, the data node determines whether the record is a commit or abort record. When the record is not a commit or an abort record, the record is replayed in step 180, and the data center returns to step 174. When the record is a commit or abort record, the data node proceeds to step 182.

The data node determines whether the transaction ID is the target transaction in step 182. When the transaction ID is not the target transaction ID, the data node sets the transaction timestamp entry in the transaction table in step 184, and proceeds to step 174. When the transaction ID is the target transaction ID, the data node proceeds to step 186.

In step 186, the target transaction is replaced with a commit timestamp. Then, the entry to the transaction table is set to commit in step 188. Next, committed transactions in the transaction table are changed to aborted transaction if their timestamp is after the target transaction's timestamp in step 190. If their timestamp is before the target transaction timestamp, their status stays the same. Then, the data node proceeds to step 156.

Figure 6:
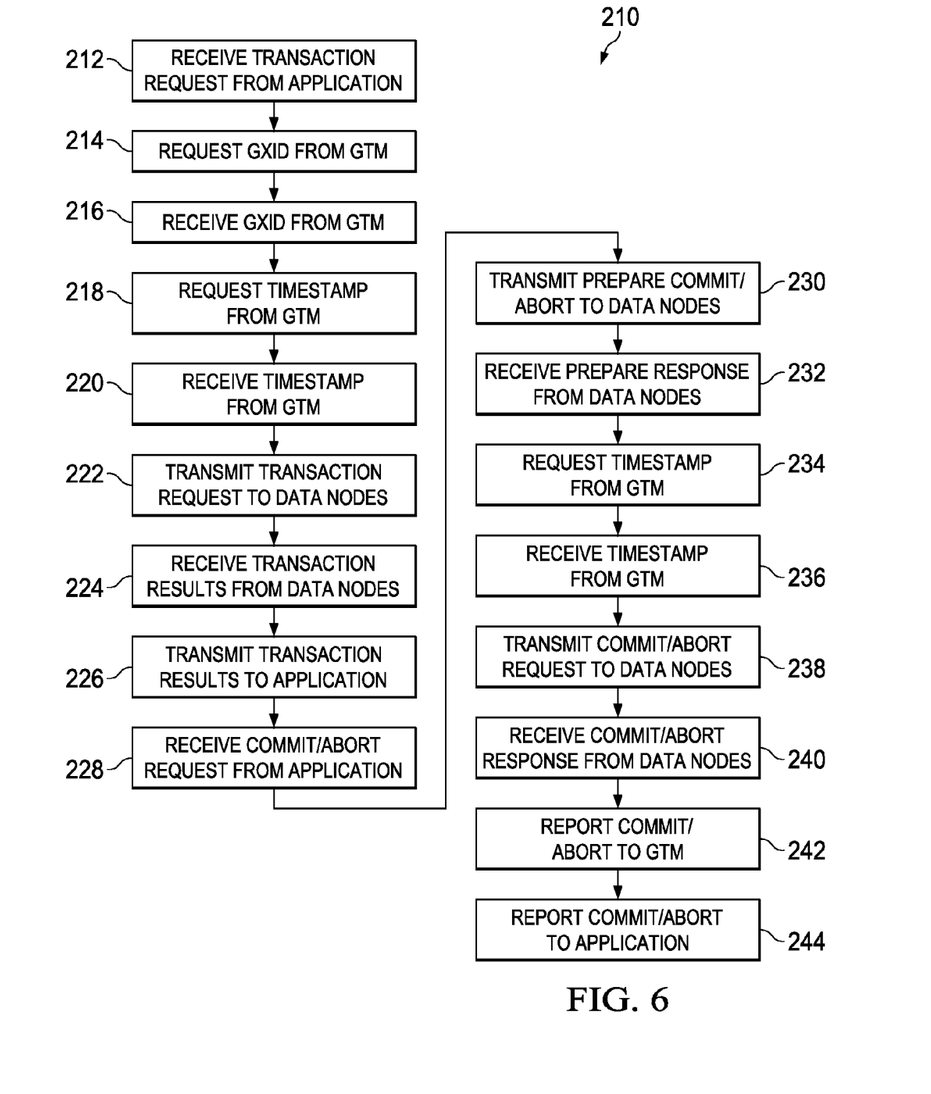
FIG. 6 illustrates a flowchart for an embodiment method of performing a transaction in an MPP database performed by a coordinator.

FIG. 6 illustrates flowchart 210 for a method of performing a transaction in an MPP database performed by a coordinator. Initially, in step 212, the coordinator receives a transaction request from an application. The application may be a bank looking up the amount of money in a bank account or an ATM requesting a withdrawal of money.

Next, in step 214, the coordinator requests a GXID from the GTM. The GXID is a global transaction ID, a globally unique identifier for the transaction.

In response, the coordinator receives the GXID from the GTM in step 216.

Then, the coordinator requests a timestamp from the GTM in step 218. The reader timestamp is the timestamp at the beginning of the transaction.

In response, the coordinator receives the reader timestamp from the GTM in step 220.

In step 222, the coordinator transmits a transaction request to the data nodes performing the transaction. The transaction requests include the GXID and the reader timestamp.

The data nodes respond to the coordinator with results of the transaction in step 224. The results may be SQL results. Each data node involved in the transaction transmits its results to the coordinator.

The coordinator transmits the transaction results to the application in step 226. The application examines the results.

Next, in step 228, the coordinator receives a commit or abort request from the application. This begins a two phase commit procedure.

In step 230, the coordinator transmits a prepare commit message to the data nodes. This message is sent to the data nodes that performed the transaction.

In response, the coordinator receives prepare responses from the data nodes in step 232. The prepare responses indicate that the data nodes have prepared to commit.

Then, in step 234, the coordinator requests a commit timestamp or an abort timestamp from the GTM based on the responses from the data nodes.

In response, the coordinator receives the commit timestamp from the GTM in step 236.

Next, in step 238, the coordinator transmits commit requests or abort requests to the data nodes. The commit requests include the commit timestamp, and the abort requests include the abort timestamp.

The coordinator, in step 240, receives commit or abort responses from the data nodes. The commit responses indicate that the commit has been successfully performed, while the abort responses indicate that the abort has been successfully performed.

The coordinator notifies the GTM that the transaction has been successfully committed or aborted in step 242.

Also, in step 244, the coordinator notifies the application that the transaction has successfully been committed or aborted. The transaction is now complete.

Figure 7:
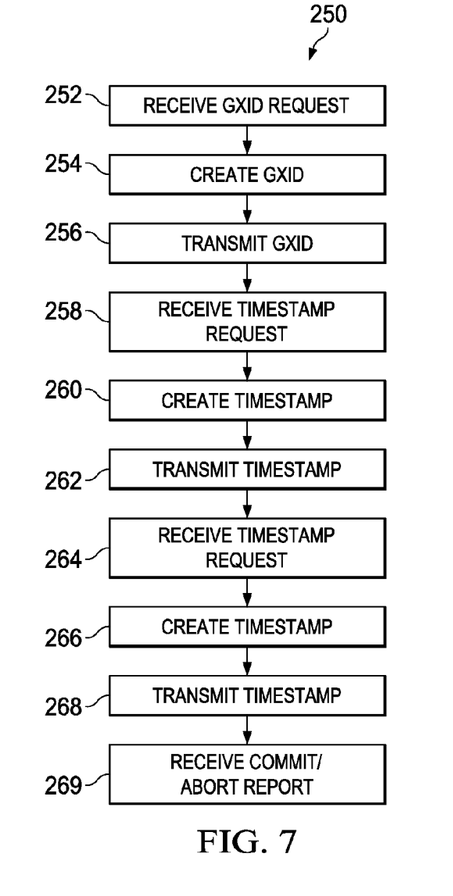
FIG. 7 illustrates a flowchart for an embodiment method of performing a transaction in an MPP database performed by a global transaction manager (GTM)

FIG. 7 illustrates flowchart 250 for a method of performing a transaction in an MPP database performed by a GTM. Initially, in step 252, the GTM receives a GXID request from a coordinator.

Next, in step 254, the GTM creates a GXID. The GXID is a unique identifier that globally identifies this transaction. In one example, the GXIDs are an ascending sequence.

Then, in step 256, the GTM transmits the GXID to the coordinator.

In step 258, the GTM receives a reader timestamp request from the coordinator. This timestamp request is requesting a reader timestamp.

Next, in step 260, the GTM creates the reader timestamp. This may be created, for example, using a gettimeofday call.

Then, in step 262, the GTM transmits the reader timestamp to the coordinator.

The GTM receives a commit or abort timestamp request in step 264.

In step 266, the GTM creates the commit timestamp or an abort timestamp.

Next, in step 268, the GTM transmits the commit timestamp to the coordinator.

Finally, in step 269, the GTM receives a commit report or an abort report from the coordinator. The commit report indicates that the commit has been successfully performed. The abort report indicates that the abort has been successfully performed.

Figure 8:
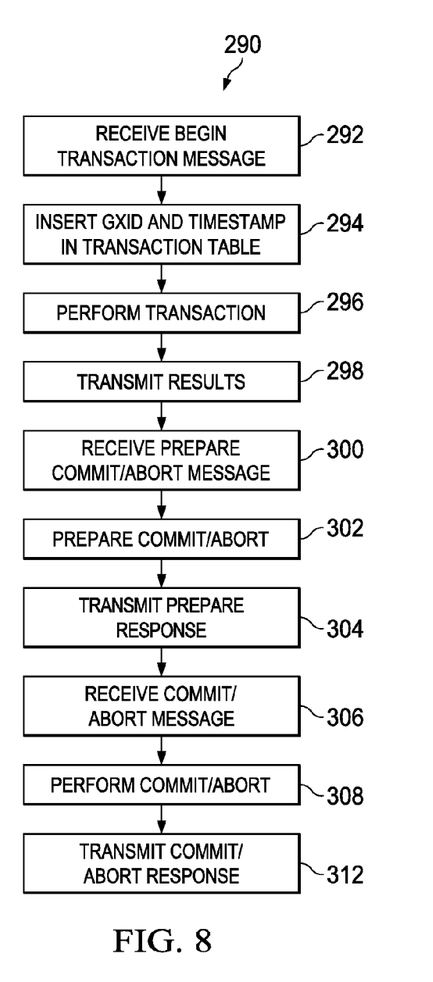
FIG. 8 illustrates a flowchart for an embodiment method of performing a transaction in an MPP database performed by a data node.

FIG. 8 illustrates flowchart 290 for a method of performing a transaction in an MPP database performed by a data node. Initially, in step 292, the data node receives a begin transaction message from the coordinator. The begin transaction message contains the GXID and the reader timestamp. The begin transaction message also contains the GXID when the transaction is not a read-only transaction.

Next, in step 294, the data node inserts the GXID and the reader timestamp in the transaction table. The data nodes maintain their own transaction tables.

In step 296, the data node performs the transaction. The data nodes may each perform a portion of the transaction in a share nothing configuration. The transaction may be a SQL transaction.

In step 298, the data node transmits the results of the transaction performed in step 296 to the coordinator.

The data node receives a prepare commit message or an abort message from the coordinator in step 300.

Then, in step 302, the data node prepares to commit or abort, based on the prepare commit or abort message. To prepare to commit, the data node completes previous requests from the transaction and writes log records generated by the transaction to permanent storage. An abort message instructs the data node to abort the transaction. The abort message includes the abort timestamp. The data node goes step 308 to complete the abort. Next, if receiving a prepare commit message, the data node transmits a prepare response to the coordinator in step 304. The prepare response indicates that the data node has successfully prepared to commit.

In step 306, the data node receives a commit message from the coordinator. The commit message instructs the data node to commit the transaction. The commit message includes the commit timestamp.

Then, in step 308, the data node performs the commit or abort. The data node replaces the reader timestamp in the transaction table with the commit timestamp or the abort timestamp. Also, the data node stores the commit timestamp in the transaction log record or the abort timestamp in the transaction log.

Finally, in step 312, the data node transmits a commit response or an abort response to the coordinator. The commit response indicates that the data node has committed its portion of the transaction, while the abort response indicates that the data node has aborted the transaction.

Figure 9:
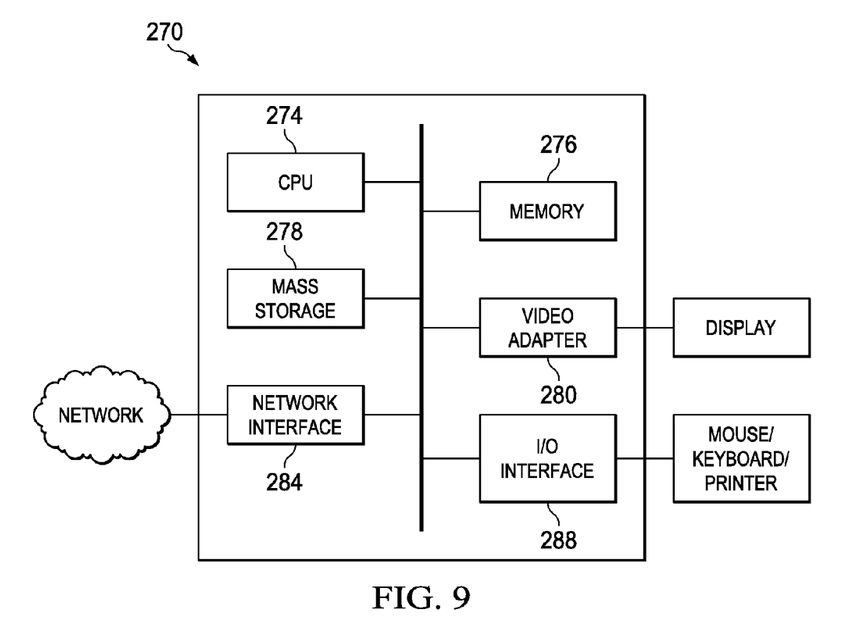
FIG. 9 illustrates a block diagram of an embodiment general-purpose computer system.

FIG. 9 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of performing point-in-time recovery (PITR) in a massively parallel processing (MPP) database, the method comprising:
   receiving, by a data node of the MPP database from a coordinator of the MPP database, a PITR recovery request;
   reading, by the data node from first storage, a log record of the MPP database, wherein the log record comprises a global timestamp;
   determining, by the data node, that a transaction type of the log record is an abort transaction or a commit transaction;
   determining, by the data node, that a target type of the PITR request is a target time or a transaction type;
   updating, by the data node, a transaction table in local storage of the data node based on the transaction type of the log record being an abort transaction or a commit transaction, based on the global timestamp, and based on the target type; and
   performing, by the data node, a transaction in accordance with the updated transaction table stored in the local storage of the data node.

2. The method of claim 1, further comprising:
   receiving, by the data node from the coordinator, a second PITR recovery request;
   reading a second log record of the MPP database;
   determining that a second transaction type of the second log record is not the abort transaction or the commit transaction; and
   replaying the second log record based on determining that the second transaction type of the second log record is not the abort transaction or the commit transaction.

3. The method of claim 1,
   wherein, based on determining that the target type of the PITR recovery request is the target time, updating the transaction table further comprises:
   determining that the transaction type of the log record is the commit transaction;
   determining that the global timestamp of the log record is before the target time, after determining that the transaction type of the log record is the commit transaction; and
   setting a transaction state of the transaction table to commit based on determining that the global timestamp of the log record is before the target time.

4. The method of claim 1,
   wherein, based on determining that the target type of the PITR recovery request is the transaction type, updating the transaction table further comprises:
   determining that a transaction identifier (ID) of the target is a transaction ID of the log record; and
   updating the transaction table in accordance with the transaction ID of the target based on determining that the transaction ID of the target is the transaction ID of the log record.

5. The method of claim 4, wherein updating the transaction table in accordance with the transaction ID of the target comprises:

setting a timestamp of the transaction table to a commit timestamp;
setting a transaction state of the transaction table to commit; and
setting the transaction state of the transaction table to abort based on determining that the timestamp of the transaction table is before the target time.

6. The method of claim 1, further comprising:
receiving, by the data node from the coordinator, a begin transaction message comprising a global transaction identification number (GXID) and a reader timestamp;
entering the GXID and the reader timestamp in a transaction table to produce a transaction entry;
performing a transaction in accordance with the begin transaction message producing transaction results; and
transmitting, by the data node to the coordinator, the transaction results.

7. The method of claim 6, further comprising:
receiving, by the data node from the coordinator, a commit message comprising a commit timestamp;
replacing the reader timestamp in the transaction entry with the commit timestamp;
storing the commit timestamp in the log record; and
transmitting, by the data node to the coordinator, a commit response.

8. The method of claim 6, further comprising:
receiving, by the data node from the coordinator, a prepare commit message; and
transmitting, by the data node to the coordinator, a prepare response.

9. The method of claim 6, further comprising:
receiving, by the data node from the coordinator, an abort message comprising an abort timestamp;
replacing the reader timestamp in the transaction entry with the abort timestamp;
storing the abort timestamp in the log record; and
transmitting, by the data node to the coordinator, an abort response.

10. The method of claim 1,
wherein, based on determining that the target type of the PITR recovery request is the target time, updating the transaction table further comprises:
determining that the transaction type of the log record is the abort transaction; and
setting a state of the transaction table to transaction abort based on determining that the log record is the abort transaction.

11. The method of claim 1,
wherein, based on determining that the target type of the PITR recovery request is the target time, updating the transaction table further comprises:
determining that the transaction type of the log record is the commit transaction;
determining that the global timestamp of the log record is not before the target time, after determining that the transaction type of the log record is the commit transaction; and
setting a state of the transaction table to transaction abort based on determining that the log record is the abort transaction.

12. The method of claim 1,
wherein, based on determining that the target type of the PITR recovery request is the transaction type, updating the transaction table further comprises:
determining that a transaction identifier (ID) of the target is not a transaction ID of the log record; and
setting a timestamp of the transaction table in accordance with the log record based on determining that the transaction ID of the target is not the transaction ID of the log record.

13. The method of claim 1, wherein the transaction table comprises a transaction identifier, a transaction type, and a timestamp.

14. A data node of a massively parallel processing (MPP) database, the data node comprising:
a local storage;
a memory storage comprising instructions; and
one or more processors in communication with the memory, wherein the one or more processors execute the instructions to:
receive, from a coordinator of the MPP database, a point-in-time recovery (PITR) recovery request;
read, from first storage, a log record of the MPP database, wherein the log record comprises a global timestamp;
determine that a transaction type of the log record is an abort transaction or a commit transaction;
determine that a target type of the PITR is a target time or a transaction type;
update a transaction table in the local storage of the data node, based on the transaction type of the log record being an abort transaction or a commit transaction, based on the global timestamp, and based on the target type; and
perform a transaction in accordance with the updated transaction table stored in the local storage of the data node.

15. The data node of claim 14, wherein the one or more processors execute the instructions to replay the log record when the transaction type of the log record is not the abort transaction or the commit transaction.

16. The data node of claim 14, wherein, when the target type of the PITR recovery request is the target time, the one or more processor execute the instructions to:
determine whether the transaction type of the log record is the commit transaction or the abort transaction;
determine whether the global timestamp of the log record is before the target time when the transaction type of the log record is the commit transaction;
set a state of the transaction table to commit when the global timestamp of the log record is before the target time; and
set the state of the transaction table to transaction abort when the global timestamp of the log record is not before the target time, or the log record is the abort transaction.

17. The data node of claim 14, wherein, when the target type of the PITR recovery request is the transaction type, the one or more processor execute the instructions to:
determine whether a transaction identification (ID) of the target is a transaction ID of the log record;
set a timestamp of the transaction table in accordance with the log record when the transaction ID of the target is not the transaction ID of the log record; and
update the transaction table in accordance with the transaction ID of the target when the transaction ID of the target is the transaction ID of the log record.

18. The data node of claim 17, wherein the one or more processor execute the instructions to:
replace the timestamp of the transaction table with a commit timestamp;
set a state of the transaction table to commit; and set the state of the transaction table to abort when the timestamp of the transaction table is before the target time.

19. A non-transitory computer readable storage medium storing computer instructions that when executed by one or more processors of a data node of a massively parallel processing (MPP) database perform the steps of:
receive, from a coordinator of the MPP database, a point-in-time recovery (PITR) recovery request;
read, from first storage, a log record of a massively parallel processing (MPP) database, wherein the log record comprises a global timestamp;
determine that a transaction type of the log record is an abort transaction or a commit transaction;
determine that a target type of the PITR request is a target time or a transaction type;
update a transaction table in local storage of the data node, based on the transaction type of the log record being an abort transaction or a commit transaction, based on the global timestamp, and based on the target type; and
perform a transaction in accordance with the updated transaction table stored in the local storage of the data node.

20. The non-transitory computer readable storage medium of claim 19,
wherein, based on determining that the target type of the PITR recovery request is the target time, the instructions to update the transaction table further comprise instructions to:
determine that the transaction type of the log record is the commit transaction;
determine that the global timestamp of the log record is before the target time based on determining that the transaction type of the log record is the commit transaction; and
set a state of the transaction table to commit transaction after determining that the global timestamp of the log record is before the target time.

21. The non-transitory computer readable storage medium of claim 19,
wherein, based on determining that the target type of the PITR recovery request is the transaction type, the instructions to update the transaction table further comprise instructions to:
determine that a transaction identifier (ID) of the target is a transaction ID of the log record; and
update the transaction table in accordance with the transaction ID of the target based on determining that the transaction ID of the target is the transaction ID of the log record.

* * * * *